United States Patent [19]

Bosso et al.

[11] 3,962,165

[45] June 8, 1976

[54] QUATERNARY AMMONIUM SALT-CONTAINING RESIN COMPOSITIONS

[75] Inventors: Joseph F. Bosso, Lower Burrell; Marco Wismer, Gibsonia, both of Pa.

[73] Assignee: PPG Industries, Inc., Pittsburgh, Pa.

[22] Filed: Apr. 4, 1974

[21] Appl. No.: 457,881

Related U.S. Application Data

[60] Continuation-in-part of Ser. No. 277,697, Aug. 3, 1972, abandoned, which is a continuation-in-part of applications Ser. No. 100,825, Dec. 22, 1970, abandoned, Ser. No. 100,834, Dec. 22, 1970, abandoned, Ser. No. 129,267, Mar. 29, 1971, abandoned, Ser. No. 158,063, June 29, 1971, abandoned, and Ser. No. 167,470, July 29, 1971, said Ser. No. 158,063 is a division of Ser. No. 772,366, Oct. 31, 1968, abandoned. Said Ser. No. 167,470 is a continuation-in-part of Ser. No. 840,847, July 10, 1969, abandoned and Ser. No. 840,848, July 10, 1969, abandoned, and a continuation-in-part of said Ser. No. 100,825 and said Ser. No. 100,834, both being a continuation-in-part of Ser. No. 56,730, July 20, 1970, abandoned, which is a continuation-in-part of said Ser. No. 772,366, Oct. 31, 1968, abandoned.

[52] U.S. Cl. ........................ 260/29.2 EP; 204/181; 260/47 EN; 260/59 EP; 260/830 R; 260/836; 260/837 R; 428/263

[51] Int. Cl.² ............... C08G 30/16; C08G 51/24
[58] Field of Search ............... 260/29.2 EP, 47 EN, 260/47 EP, 2 EP, 59, 18 PF, 18 EP, 830, 836, 837; 204/181

[56] References Cited
UNITED STATES PATENTS

| | | | |
|---|---|---|---|
| 2,676,166 | 4/1954 | Webers | 260/85.7 |
| 2,681,901 | 6/1954 | Wiles | 260/47 |
| 3,429,839 | 2/1969 | Franco | 260/8 |

*Primary Examiner*—Murray Tillman
*Assistant Examiner*—T. Pertilla
*Attorney, Agent, or Firm*—William J. Uhl

[57] ABSTRACT

Water-dispersible salt-containing containing quaternary ammonium salt groups are prepared by reacting a polyglycidyl ether of a polyphenol and an amine acid salt. When dispersed or dissolved in water, the quaternary ammonium salt-contaning resins can be applied to a wide variety of different substrates by electrodeposition, and will deposit on the cathode to provide coatings of unique properties.

16 Claims, No Drawings

QUATERNARY AMMONIUM SALT-CONTAINING RESIN COMPOSITIONS

CROSS-REFERENCES TO RELATED APPLICATIONS

This application is a continuation-in-part of copending application Ser. No. 277,697, filed Aug. 3, 1972, now abandoned, which in turn is a continuation-in-part of applications (A) Ser. No. 158,063, filed June 29, 1971, now abandoned; (B) Ser. No. 167,470, filed July 29, 1971; (C) Ser. No. 129,267, filed Mar. 29, 1971, now abandoned; and (D) Ser. Nos. 100,825 and 100,834, both filed Dec. 22, 1970, and both now abandoned. Application Ser. No. 158,063 (A) in turn is a division of copending application Ser. No. 772,366, filed Oct. 31, 1968, now abandoned; application Ser. No. 167,470 (B) is, in turn, a continuation-in-part of copending applications Ser. Nos. 840,847 and 840,848, both filed July 10, 1969, both now abandoned, as well as a continuation-in-part of copending applications Ser. Nos. 100,825 and 100,834 (D) both filed Dec. 22, 1970; Applications Ser. Nos. 100,825 and 100,834 (D) both in turn being continuations-in-part of copending application Ser. No. 56,730, filed July 20, 1970, now abandoned, which, in turn, is a continuation-in-part of copending application Ser. No. 772,366, filed Oct. 31, 1968, now abandoned.

BACKGROUND OF THE INVENTION

Recently, there has been developed a group of water-dispersible ammonium salt-containing resins which have utility in the area of electrodepositable compositions depositable on the cathode.

These resins, which are disclosed in the prior copending applications set forth above, which applications are herein incorporated by reference, are prepared by reacting an epoxy group-containing organic material, and preferably a resin which is a polyepoxide containing a plurality of epoxy groups, with an amine acid salt, thereby yielding a resin containing epoxy groups and quaternary ammonium salt groups. As disclosed therein [and as claimed in Ser. No. 277,007, filed Aug. 1, 1972 (a divisional application of Ser. No. 167,470)], these compositions also preferably contain boron in the form of boric acid, a boron ester, or a compound which forms boric acid in aqueous medium.

DESCRIPTION OF THE INVENTION

While, as described in the above-mentioned copending applications, the presence of boron has been found to be of substantial benefit since the boron compounds apparently catalyze the cure of the deposited films, allowing lower cure temperatures and/or harder films, it has also been found that highly useful compositions may be provided which are boron-free and which are either epoxy-containing or essentially epoxy-free. The advantages of a boron-free composition include increased water dispersibility of the resin and elimination of a buildup of boric acid in the electrodeposition bath.

Thus, the instant invention is directed to boron-free, quaternary ammonium salt-containing resins based on polyglycidyl ethers of polyphenols. The boron-free quaternary ammonium salt-containing resins may be epoxy containing or they may be essentially epoxy-free, and are produced by reacting a polyglycidyl ether of a polyphenol with an amine acid salt. Preferably, the polyglycidyl ether of a polyphenol and the amine acid salt are reacted in the presence of water.

The resins of the instant invention are characterized as boron-free, ungelled, water-dispersible resins containing quaternary ammonium salt groups. The quaternary ammonium salt-containing resins of the instant invention may contain epoxy groups, or they may be essentially epoxy-group free. The resins may also optionally contain oxyalkylene groups. The salt forming the quaternary ammonium salt is preferably the salt of an acid having a dissociation constant greater than $1 \times 10^{-5}$.

The quaternary ammonium salt-containing resins of the instant invention preferably contain at least about 0.05 and preferably up to about 16 percent by weight nitrogen in the form of chemically-bound quaternary ammonium base salt groups.

The epoxy group-containing organic materials used to produce the quaternary ammonium salt-containing resins of the instant invention are polyglycidyl ethers of polyphenols, such as Bisphenol A. These materials are known in the art, and may be produced, for example, by etherification of a polyphenol with epichlorohydrin or dichlorohydrin in the presence of an alkali. The phenolic compound may be bis(4-hydroxyphenyl)2,2-propane, 4,4'-dihydroxybenzophenone, bis(4-hydroxyphenyl)1,1-ethane, bis(4-hydroxyphenyl)1,1-isobutane, bis(4-hydroxytertiarybutylphenyl)2,2-propane, bis(2-hydroxynaphthyl)methane, 1,5-hydroxynaphthalene, or the like. Another quite useful class of polyepoxides are produced similarly from novolak resins or similar polyphenol resins.

The preferred polygylcidyl ethers of polyphenols correspond to the average formula:

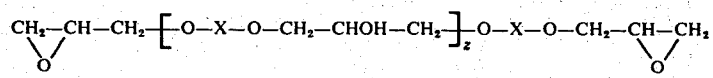

in which X represents an aromatic radical, and z represents a whole or fractional number, e.g., from 0 to 12.

Especially preferred materials of this class are the reaction products of bisphenol A and epichlorohydrin, which correspond to the structure:

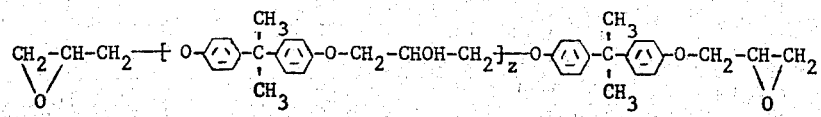

in which z represents a whole or fractional number.

The polygylcidyl ethers of polyphenols usable in the instant invention are known in the art, and are more specifically disclosed, for example, in "Epoxy Resins" by H. Lee and K. Neville, McGraw-Hill Book Company, Inc., New York (1957).

Also useful are the polyglycidyl ethers of polyphenols containing oxyalkylene groups in the epoxy molecule. Such oxyalkylene groups are typically groups of the general formula:

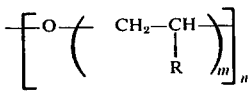

where R is hydrogen or alkyl, preferably lower alkyl (e.g., having 1 to 6 carbon atoms) and where, in most instances, $m$ is 1 to 4 and $n$ is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about one percent by weight or more, and preferably 5 percent or more, of oxyalkylene groups.

The epoxy materials which contain oxyalkylene groups are produced by reacting some of the epoxy groups of a polyglycidyl ether of a polyphenol with a monohydric alcohol containing oxyalkylene groups. Such monohydric alcohols are conveniently produced by oxyalkylating an alcohol, such as methanol, ethanol or other alkanol, with an alkylene oxide. Ethylene oxide, 1,2-propylene oxide and 1,2-butylene oxide are especially useful alkylene oxides. Other monohydric alcohols can be, for example, the commercially available materials known as Cellosolves and Carbitols, which are monoalkyl ethers of polyalkylene glycols. The reaction of the monohydric alcohol and the epoxy material is generally carried out in the presence of a catalyst. Formic acid, dimethylethanolamine, diethylethanolamine, N,N-dimethylbenzylamine, and, in some cases, stannous chloride are useful for this purpose.

Similar epoxy materials which contain oxyalkylene groups can be produced by oxyalkylating the epoxy resin by other means, such as by direct reaction with an alkylene oxide.

The polyglycidyl ethers of polyphenols employed to produce the foregoing epoxies containing oxyalkylene groups contain a sufficient number of epoxy groups so that the average number of residual epoxy groups per molecule remaining in the product after the oxyalkylation is greater than 1.0. Where oxyalkylene groups are present, the epoxy resin preferably contains from about 1 to about 90 percent or more by weight of oxyalkylene groups.

Also useful are the polyglycidyl ethers of polyphenols which are produced by reacting an acrylic polymer containing reactive sites, such as carboxyl groups or hydroxyl groups, secondary amine groups or other active hydrogen-containing sites with a polyglycidyl ether of a polyphenol. The acrylic polymers usable are known in the art and need not be discussed herein.

Yet another class of polyglycidyl ethers of polyphenols which are useful in preparing the resins of this invention are those containing urethane groups. The isocyanate-terminated polyurethane prepolymers employed as starting materials according to the present invention may be obtained by the reaction of a selected polymeric glycol. The polyurethane polymers include those which are prepared from polyalkylene ether glycols and diisocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$, in which R stands for an alkylene radical and $n$ is an integer. Glycols containing a mixture of radicals, as in the compound $HO(CH_2OC_2H_4O)_nH$, or $HO(C_2H_4O)_n(C_3H_6O)_m(C_2H_4O)_nH$, can be used. These glycols are either viscous liquids or waxy solids. Polytetramethylene ether glycols, also known as polybutylene ether glycols, may be employed. Polyethylene ether and polypropylene ether glycols, having the above-indicated formula, are among the preferred glycols. Polyethylene ether glycols, poly-1,2-propylene ether glycols, polydecamethylene ether glycols, and poly-1,2-dimethyl ethyl ether glycols are representative of other operative compounds. The presently preferred glycols are polypropylene glycols with a molecular weight between about 300 and about 1000.

Any of a wide variety of organic polyisocyanates may be employed in the reaction, including aromatic aliphatic, and cycloaliphatic diisocyanates and combinations of these types. Representative compounds include aromatic diisocyanates, such as 2,4-tolylene diisocyanate, mixtures thereof with 2,6-tolylene diisocyanates (usually about 80/20), 4,4-methylene-bis(-phenylisocyanate), and m-phenylene diisocyanate. Aliphatic compounds such as ethylene diisocyanate, methylene diisocyanate, propylene-1,2-diisocyanate, butylene-1,3-diisocyanate, tetramethylene diisocyanate, hexamethylene diisocyanate, and decamethylene diisocyanate and alicyclic compounds such as 1,2- and 1,4-cyclohexylene diisocyanate, 4,4'-methylene-bis(cyclohexyliocyanate) and isophorone diisocyanate are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Additional polyisocyanate which may be employed, for example, include: p,p'-diphenylmethane diisocyanate, 3,3'-dimethyl-4,4'-biphenylene diisocyanate, 3,3'-dimethoxyoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as bis-phenyl carbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with alpha, alpha'-dibromo-p-xylene in the presence of an alkali. In such products, the cyclic groups inserted in the polyether chain are preferably phenylene, naphthylene or cyclohexylene radicals or those containing alkyl or alkylene substituents as in the tolylene, phenylethylene or xylene radicals.

Also included in the polyurethane products are those made from a substantially linear polyester and an organic diisocyanate of the type previously described. Products of this sort are described in U.S. Pat. Nos. 2,621,166; 2,625,531 and 2,625,532. The polyesters are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, and dicarboxylic acids such as malonic, maleic, succinic, adipic, pimelic, sebacic, oxalic, phthalic, terephthalic, hexahydroterephthalic, and para-phenylene-diacetic acids, decamethylene dicarboxylic acid, and the like. Another useful group of compounds for this purpose are the polyester amide resins having terminal hydroxyl groups. The preferred polyesters may be represented by the formula HO[B-OOC-B'-COO]$_n$BOH in which B and B' are hydrocarbon radicals derived from the glycol and dicarboxylic acid respectively and $n$ is an integer. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate to give isocyanate-terminated polyurethanes for use as starting materials in the present invention. The starting polyurethane glycol is prepared by reacting a molar excess of a polymeric glycol with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Pat. No. 2,861,981, namely, those prepared from a polyisocyanate and the reaction product of an ester of an organic carboxylic acid with an excess of a saturated aliphatic glycol having only carbon atoms in its chain and a total of 8 to 14 carbon atoms, at least one two-carbon atom branch per molecule, and having terminal hydroxyl groups separated by at least six carbon atoms.

It is obvious, from the above-described methods by which the polyurethane reaction products may be prepared and from the reactants used, that these products will contain a plurality of intralinear radicals of the formula —NH—CO—O—X—O—CO—NH—, wherein the bivalent radical —O—X—O— is obtained by removing the terminal hydrogen atoms of the polymeric glycol, said glycol being selected from the group consisting of polyalkylene ether glycols, polyurethane glycols, polyalkylene arylene ether glycols, polyalkylenecycloalkylene ether glycols, polyalkylene etherpolythioether glycols, polyester amide glycols of the formula:

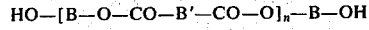

where B and B' are hydrocarbon radicals and $n$ is an integer, and that a typical isocyanate-terminated polyurethane polymer produced from diisocyanates and dihydric glycols will, on an average, contain, at a 2:1 NCO—OH ratio, a plurality of intralinear molecules conforming to the formula:

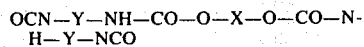

wherein —O—X—O— has the value given previously and Y is the polyisocyanate hydrocarbon radical.

In the preparation of the starting polyurethane polymer, an excess of the organic polyisocyanate of the polymeric glycol is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the polyol will be at least one and may be up to a 3:1 equivalent ratio. The glycol and the isocyanate are ordinarily reacted by heating with agitation at a temperature of 50°C. to 130°C., preferably 70°C. to 120°C. The ratio of organic polyisocyanate compound to polymeric glycol is usually and preferably between about 1.3:1 and 2.0:1.

The reaction is preferably, but not necessarily, effected in the absence of a solvent, when the prepolymer is a fluid at processing temperatures. When it is not, or when it is desired to employ a solvent, convenient solvents are inert organic solvents having a boiling range above about 90°C. when the reaction is to be carried out in open equipment. Lower boiling solvents may, of course, be used where the reaction is carried out in closed equipment to prevent boiling off the solvent at the temperatures of the reaction. Solvents boiling at substantially more than 140°C. are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended product is insoluble. Ketones, tertiary alcohols and esters may be used. The aliphatic hydrocarbon solvents such as heptanes, octanes and nonanes, or mixtures of such hydrocarbons obtained from naturally-occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution. If an emulsion technique is to be employed in the chain extension, sometimes the excess solvent is useful and is allowed to remain during the emulsification stage.

The reactants are cooked for a period sufficient to react most, if not all, of the hydroxy groups, whereafter the prepolymer is allowed to stand and the free NCO content determined.

Usual pHs are employed during preparation of the prepolymer, the reaction preferably being maintained substantially neutral. Bases accelerate the reaction, acids retard the reaction, and preferably neither are added.

These isocyanate group-containing polyurethanes are then reacted with a polyglycidyl ether of a polyphenol at temperatures of about 25°C. to about 45°C., usually in the presence of a catalyst which promotes urethane formation.

In the process of the invention, the polyglycidyl ether of a polyphenol is reacted with an amine acid salt to form quaternary amine salt group-containing resins.

The process of this invention can be used to produce essentially epoxy group-free resins as well as epoxy group-containing resins. Where the epoxide is reacted with at least about a stoichiometric amount of amine acid salt, essentially epoxide group-free resins are produced; where resins containing epoxide groups are desired, the ratio of starting polyepoxide to amine acid salt is selected so as to provide an excess of epoxy groups, thereby producing a resin containing unreacted epoxide groups. Epoxy-free resins can also be provided by hydrolysis or post reaction of the epoxide-amine acid salt reaction product.

Examples of salts which may be employed include salts of ammonia; primary, secondary and tertiary amines, and preferably tertiary amines; salts of an acid having a dissociation constant greater than that of boric acid and preferably an organic acid having a dissociation constant greater than about $1 \times 10^{-5}$. The presently preferred acid is lactic acid. Other useful acids include acetic acid, propionic acid, butyric acid, hydrochloric acid, phosphoric acid, and sulfuric acid. The amines may be unsubstituted amines or amines substituted with non-reactive constituents such as halogens or hydroxylamines. Specific amines include dimethylethanolamine, salts of lactic, propionic, butyric, hydrochloric, phosphoric and sulfuric, or similar salts in triethylamine, diethylamine, trimethylamine, diethylamine, dipropylamine, 1-amino-2-propanol, and the like. Also included are ammonium lactate, ammonium acetate, ammonium chloride, ammonium phosphate, as well as other amine and ammonium salts as defined above.

A distinct class of amine compounds within the broader class is amine containing one or more secondary or tertiary amino groups and at least one hydroxyl group.

In most cases, the hydroxyl amine employed corresponds to the general formula:

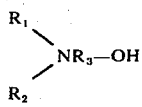

where $R_1$ and $R_2$ are, preferably, methyl, ethyl or lower alkyl groups, but can be essentially any other organic radical, so long as they do not interfere with the desired reaction. Benzyl, alkoxyalkyl and the like are examples. $R_1$ can also be hydrogen. The nature of the particular groups is less important than the presence of a secondary or tertiary amino nitrogen atom, and thus higher alkyl, aryl, alkaryl, aralkyl, and substituted groups of the types can be present. The group represented by $R_3$ is a divalent organic group, such as alkylene or substituted alkylene; e.g., oxyalkylene or poly(oxyalkylene), or even arylene, alkarylene or substituted arylene. $R_3$ can also be an unsaturated group, e.g., an alkylene group such as —CH=CH— or

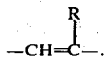

Other groups represented by $R_3$ include cyclic or aromatic groups; one type of useful amine, for instance, is represented by the formula:

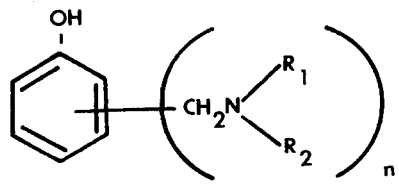

where $n$ is 1 to 3. Dialkanolamines, of the general formula $R_1N(R_3OH)_2$, and trialkanolamines, of the general formula $N(R_3OH)_3$, are also useful.

Some examples of specific amines are as follows: dimethylethanolamine, dimethylpropanolamine, dimethylisopropanolamine, dimethylbutanolamine, diethylethanolamine, ethylethanolamine, methylethanolamine, N-benzylethanolamine, diethanolamine, triethanolamine, dimethylaminoethyl phenol, tris(dimethylaminomethyl)phenol, 2-[2-(dimethylamino)ethoxy]ethanol, 1-[1-(dimethylamino)-2-propoxy]-2-propanol, 2-(2-[2-dimethylaminoethoxy]ethoxy)ethanol, 1-[2-(dimethylamino)ethoxy]-2-propanol, 1-(1-[dimethylamino)-2propoxy]-2-propoxy)-2-propanol, benzyl dimethyl amine.

Another distinct class of amine compound within the broader class is any amine containing one or more secondary or tertiary amino groups and at least one terminal carboxyl group. In most cases where a carboxyl amine is employed, it corresponds to the general formula:

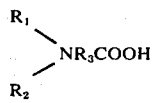

Where $R_1$ and $R_2$ are each preferably methyl, ethyl, or other lower alkyl groups, but can be essentially any other organic radical, so long as they do not interfere with the desired reaction. Benzyl, alkoxyalkyl, and the like are examples. $R_1$ can also be hydrogen. The nature of the particular groups is less important than the presence of a secondary or tertiary amino nitrogen atom, and thus higher alkyl, aryl, alkaryl, aralkyl, and substituted groups of these types can be present. The group represented by $R_3$ is a divalent organic group, such as alkylene or substituted alkylene, e.g., oxyalkylene or poly(oxyalkylene), or less desirably, arylene, alkarylene or substituted arylene. $R_3$ can also be an unsaturated group, e.g., an alkenylene group.

Such amines can be prepared by known methods. For example, an acid anhydride, such as succinic anhydride, phthalic anhydride or maleic anhydride, can be reacted with an alkanolamine, such as dimethylethanolamine or methyldiethanolamine; the group represented by $R_3$ in the amines produced in such cases contain ester groups. Other types of amines are provided, for example, by reacting an alkylamine with an alkyl acrylate or methacrylates such as methyl or ethyl acrylate or methacrylate, as described in U.S. Pat. No. 3,419,525. Preferably, the ester group is subsequently hydrolyzed to form a free carboxyl group. Other methods for producing amines of different types can also be employed.

It can be seen that the groups represented by $R_3$ can be of widely varying types. Some examples are: —R'—, —R'OCOR'—, and —(R'O)$_n$COR'—, where each R' is alkylene, such as —CH$_2$CH$_2$—,

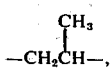

etc., or alkenylene, such as —CH=CH—, and $n$ is 2 to 10 or higher. Other groups represented by R' include cyclic or aromatic groups.

Some examples of specific amines are as follows:
N,N-dimethylaminoethyl hydrogen maleate
N,N-diethylaminoethyl hydrogen maleate
N,N-dimethylaminoethyl hydrogen succinate
N,N-dimethylaminoethyl hydrogen phthalate
N,N-dimethylaminoethyl hydrogen hexahydrophthalate
2-(2-dimethylaminoethoxy)ethyl hydrogen maleate
1-methyl-2-(2-dimethylaminoethoxy)ethyl hydrogen maleate
2-(2-dimethylaminoethoxy)ethyl hydrogen succinate
1,1-dimethyl-2-(2-dimethylaminoethoxy)ethyl hydrogen succinate
2-[2-(2-dimethylaminoethoxy)ethoxy]ethyl hydrogen maleate
beta-(dimethylamino)propionic acid
beta-(dimethylamino)isobutyric acid
beta-(diethylamino)propionic acid
1-methyl-2-(dimethylamino)ethyl hydrogen maleate
2-(methylamino)ethyl hydrogen succinate
3-(ethylamino)propyl hydrogen maleate
2[2-(dimethylamino)ethoxy]ethyl hydrogen adipate
N,N-dimethylaminoethyl hydrogen azelate
di(N,N-dimethylaminoethyl)hydrogen tricarballylate
N,N-dimethylaminoethyl hydrogen itaconate
1-(1-[1(dimethylamino)-2-propoxy]2-propoxy)-2-propyl hydrogen maleate
2-[2-(2-[2-(dimethylamino)ethoxy]ethoxy)ethoxy]ethyl hydrogen succinate It is also to be recognized that useful compositions can be produced by first reacting an amine with a polyglycidyl ether of a polyphenol, and then adding an acid and subsequently heating the reaction mixture to a suitable reaction temperature as hereinafter indicated. The amine and the epoxy groups are reacted until a tertiary amine is formed. The addition of the acid then causes a tertiary amine acid salt to form, which amine acid salt, upon heating, will then react with any residual epoxy groups present. In the event no epoxy groups are present after the amine acid salt formation is complete, additional epoxy material must be added.

Regardless of the method chosen to produce the composition of the instant invention, the critical reaction which forms the quaternary ammonium salt is that between an amine acid salt and the epoxy group or groups of the polyglycidyl ether of a polyphenol.

The amine acid salts and the polyglycidyl ether of a polyphenol are preferably reacted by mixing the components in the presence of a sufficient amount of water to provide an exothermally controlled reaction. The amount of water employed should be that amount of water which allows for smooth reaction but not so much as to cause extremely slow or nonreaction. Typically, the water is employed on the basis of about 1.75 percent to about 20 percent by weight based on the total reaction mixture solids and preferably about 2 percent to about 15 percent by weight, based on total reaction solids.

Another measure of the amount of water which may be employed is the equivalent ratio of water to amine nitrogen contained in the amine acid salt. Typically the equivalent ratio of water to amine nitrogen is controlled between about 1.3 and about 16 equivalents of water per equivalent of amine nitrogen. Preferably, the ratio of water to amine nitrogen is controlled between about 1.5 and about 11.0 equivalents of water per equivalent of amine nitrogen.

The reaction temperature may be varied between about the lowest temperature at which the reaction reasonably proceeds, for example, room temperature, or in the usual case, slightly above ordinary room temperature to a maximum temperature between about 100°C. and about 110°C. Preferably, the reaction temperature is maintained at moderately elevated temperatures such as about 70°C. to about 100°C. since it has been found that quaternary ammonium groups are not generally formed at lower reaction temperatures.

A solvent is not necessary, although one is often used in order to afford better control of the reaction. Aromatic hydrocarbons or monoalkyl ethers of ethylene glycol are suitable solvents. The proportions of the amine salt and the epoxy compound can be varied and the optimum proportions depend upon the particular reactants. Ordinarily, however, from about one part to about 50 parts by weight of the salt per 100 parts of epoxy compound are employed. The proportions are usually chosen with reference to the amount of nitrogen in the amine acid salt, which is typically from about 0.05 to about 16 percent based on the total weight of the amine salt and the epoxy compound. Since the amine acid salt reacts with the epoxide groups of the epoxy resin employed, in order to provide an epoxy group-containing resin, the stoichiometric amount of amine employed should be less than the stoichiometric equivalent of the epoxide groups present, so that the final resin is provided with one epoxy group per average molecule. Similarly, if an essentially epoxy group free resin is desired, either an excess or a stoichiometric amount of amine is employed.

The particular reactants, proportions and reaction conditions should be chosen in accordance with considerations well-known in the art, so as to avoid gellation of the product during the reaction. For example, excessively severe reaction conditions should not be employed. Similarly, compounds having reactive substituents should not be utilized along with epoxy compounds with which those substituents might react adversely at the desired conditions.

The product forming the resin of the invention may be crosslinked to some extent; however, it remains soluble in certain organic solvents and can be further cured to a hard, thermoset state. It is significantly characterized by its epoxy content and chemically-bound quaternary ammonium content. While the resins disclosed herein are characterized as either essentially epoxy free or as containing at least one epoxy group, it is to be recognized that mixtures of the two types of resin may be used. The resins herein are further characterized as being boron free.

Aqueous compositions containing the above reaction products are highly useful as coating compositions and can be applied by any conventional method, such as by dipping, brushing, etc. They are, however, eminently suited to application by electrodeposition.

Where the resin of the invention was prepared employing at least in part a salt of an acid having a dissociation constant greater than $1 \times 10^{-5}$, it is not necessary to add a solubilizing agent to the product to obtain a suitable aqueous electrodepositable composition, although an acid or acidic solubilizing agent can be added if desired.

The acid or acidic solubilizing agent may be any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions. In some cases, the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

Where a carboxyl amine is employed in forming the resin of the invention, the resultant resin contains a Zwitterion, or internal salt, that is, an interaction between the quaternary group formed and the carboxyl group present, the carboxyl group displaying a dissociation constant greater than $1 \times 10^{-5}$. The resultant resin is inherently self-solubilized without the use of external solubilizing agents.

The resin in aqueous medium can be characterized as a water-containing medium containing an ungelled water-dispersible, boron-free, reaction product of a polyglycidyl ether of a polyphenol and an amine acid salt, which reaction product contains chemically-bound quaternary ammonium base salts.

The resin preferably contains from about 0.05 to about 16 percent by weight of nitrogen in the form of chemically-bound quaternary ammonium base salt groups.

The concentration of the product in water depends upon the process parameters to be used and is, in general, not critical, but ordinarily the major proportion of the aqueous composition is water, e.g., the composition may contain from one to 25 percent by weight of the resin. Preferably, the electrodepositable compositions of the invention contain a coupling solvent. The use of a coupling solvent provides for improved deposited film appearance. These solvents include hydrocarbons, alcohols, esters, ethers, and ketones. The preferred coupling solvents include monoalcohols, glycols, and polyols as well as ketones and ether alcohols. Specific coupling solvents include isopropanol, butanol, isophorone, Pentoxone (4-methoxy-4-methyl pentanone-2), ethylene and propylene glycol, the monomethyl, monoethyl and monobutyl ethers of ethylene glycol, 2-ethylhexanol, and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 and about 25 percent by weight of the dispersant is employed.

While the resin hereinabove described may be electrodeposited as substantially the sole resinous component of the electrodeposited composition, it is frequently desirable in order to improve or modify film appearance and/or film properties, to incorporate into the electrodepositable compositions various non-reactive and reactive compounds or resinous materials, such as plasticizing material including N-cyclohexyl-p-toluene sulfonamide, ortho- and para-toluene sulfonamide, N-ethyl-ortho- and paratoluene sulfonamide, aromatic and aliphatic polyether polyols, phenolic resins including allyl ether containing phenolic resins, liquid epoxy resins, quadrols, polycaprolactones; triazine resins such as melamine-based resins and benzoguanamine-based resins, especially alkylated formaldehyde reaction products thereof; urea formaldehyde resins, acrylic resins, hydroxy and/or carboxyl group-containing polyesters and hydrocarbon resins.

Other materials include esters such as butylbenzyl phthalate, dioctyl phthalate, methyl phthalylethyl glycolate, butylphthalylbutyl glycolate, cresyl diphenyl phosphate, 2-ethylhexyl diphenyl phosphate, polyethylene glycol 200 dibenzoates as well as polyesters, 2,2,4-trimethyl pentanediol monoisobutyrate (Texanol).

In most instances, a pigment composition and, if desired, various additives such as anti-oxidants, surfactants, or wetting agents, for example, Foam Kill 639 (a hydrocarbon oil-containing inert diatomaceous earth), as well as glycolated acetylenes (the Surfynols, for example), sulfonates, sulfated fatty amides, and alkyl-phenoxypolyoxyalkylene alkanols, and the like, are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general, similar to those used in electrodeposition of other types of coatings. The applied voltage may be varied greatly and can be, for example, as low as one volt or as high as several thousand volts, although typically between 50 and 500 volts. The current density is usually between about 1.0 ampere and 15 amperes per square foot, and tends to decrease during electrodeposition.

The resin of the invention when freshly electrodeposited on the cathode contains quaternary ammonium base groups. The acid moiety which forms the salt migrates at least in part toward the anode. The film, while it may be crosslinked to some extent, remains soluble in certain organic solvents.

The freshly-deposited, uncured electrodepositable film may be characterized as follows: a boron-free epoxy resin electrodeposited upon an electrically conductive substrate, wherein the epoxy resin is the reaction product of a polyglycidyl ether of a polyphenol and an amine acid salt, which contains chemically-bound quaternary ammonium base, and which optionally contains epoxy groups.

The method of the invention is applicable to the coatings of any conductive substrate, and especially metals such as steel, aluminum, copper, magnesium or the like. After deposition, the coating is cured, usually by baking at elevated temperatures. Temperatures of 250°F. to 500°F. for one to 30 minutes are typical baking schedules utilized.

During the cure, especially at elevated temperatures, at least a substantial portion of the quaternary ammonium base decomposes to tertiary amine nitrogen, which aids in the crosslinking of the coating, which upon curing is infusible and insoluble.

As set forth above, the significant resin constituents are (A) a resin derived from the reaction between a polyglycidyl ether of a polyphenol and an amine acid salt; (B) quaternary ammonium groups; and optionally (C) salts of acids having a dissociation constant greater than $1 \times 10^{-5}$, and (D) epoxy groups. All these components may be qualitatively and quantitatively determined by numerous methods known in the art.

Epoxy groups may be determined by the well known pyridinium hydrochloride method as described, for example, in Siggia, "QUANTITATIVE ORGANIC ANALYSIS VIA FUNCTIONAL GROUPS", John Wiley & Sons, Inc., New York (1963), page 242.

The total base groups present in the polymer, that is, quaternary and any amine groups present, may be determined on a separate resin sample. (When reacting the amine acid salt and the epoxy compound, in some instances, not all of the amine groups of the amine salt are quaternized. Thus, some amine nitrogen may be present from reaction with the epoxy groups.) Usually the resin sample will be neutral. If, however, the resin is basic, the sample should be neutralized with a known amount of the acid present in the resin as a salt. Where the acid present in the resin as a salt is a weak acid as compared to HCl, the resin is titrated with HCl and back-titrated with sodium hydroxide on an automatic titrator. The HCl titration yields the total base groups present. The sodium hydroxide back-titration distinguishes quaternary groups from amine groups. For example, a typical analysis is conducted as follows: a 10 milliliter sample of an about 10 percent solids electrodeposition bath is pipetted in 60 milliliters of tetrahydrofuran. The sample is titrated with 0.1000 normal HCl to the pH end point. The amount of standard acid used is equivalent to the quaternary base and amine equivalents present. The sample is then titrated with 0.1000 normal sodium hydroxide to give a titration curve with multiple end points. In a typical instance, the first end point corresponds to excess HCl. From the HCl titration, the second end point corresponds to the neutralization of the weak acid (for example, lactic acid) and amine hydrochloride. The different in volume between the two endpoints gives the volume of standard base equivalent to the weak acid and amine content of the sample.

Excess weak acid or amine salt in the electrodeposition bath may be determined by alcoholic-KOH titration. For example, a 10 milliliter sample of about 10 percent solids electrodeposition bath is pipetted into 60 milliliters of tetrahydrofuran and potentiometrically titrated with 0.1000 normal alcoholic KOH to the first end point. The amount of KOH consumed is equivalent to any acid or amine salt in the sample. In the case of neutral compositions, KOH titration is a measure of the amount of any amine present in the form of amine salt since the quaternary, being a strong base, will not titrate.

In the case of the presence of acid salts of strong acids, other methods must be employed to determine acid, amine and quaternary groups present. For example, where the resin contains amine hydrochloride and quaternary hydrochloride groups, the resin may be dispersed, for example, in a mixture of glacial acetic acid and tetrahydrofuran, the chloride complexed with mercuric acetate and the sample titrated with perchloric acid to yield the total amine and quaternary groups. Separate alcoholic KOH titration will yield the amine groups present since the quaternary is of comparable strength to the alcoholic KOH.

The above definition is exemplary of the technique employed to quantitatively and qualitatively identify the groups present. In specific case, analytical techniques may be adapted to a specific resin; however, in each case, consistent with the above description, there exists methods known in the art which yield appropriate accurate determinations of the significant chemical moiety content.

Illustrating the invention are the following examples, which, however, are not to be construed as limiting the invention to their details. All parts and percentages in the examples, as well as throughout this specification, are by weight unless otherwise specified.

In several of the examples, there are employed oxyalkylene containing polyepoxides produced by reacting one mole of poly(oxyalkylene)glycol with two moles of polyepoxide. "Polyepoxide A" as utilized below is such a reaction product made from polypropylene glycol (molecular weight about 425) and "Epon 384", which is a Bisphenol A epichlorohydrin epoxy having an average molecular weight of about 450 and an epoxide equivalent of 225–290. "Polyepoxide B" is the reaction product made from polypropylene glycol (molecular weight about 1500) and "Epon 1031", a polyphenol-epichlorohydrin epoxy having an average molecular weight of about 900 and an epoxide equivalent of about 225.

EXAMPLE A

A dimethyl ethanolamine lactate was prepared by admixing 13.3 parts of dimethyl ethanolamine and 18.0 parts of lactic acid (85 percent solution in water). The mixture was held at 40°–60°C. for a short time and there was then added 7.2 parts of isopropanol. The final composition comprising 75 percent solids and contained 7.1 percent water.

EXAMPLE I

Into a reactor equipped with stirrer, thermometer, condenser, inert gas sparge and heating element, were charged 500 parts of Epon 840 and 65 parts of isophorone.

A salt solution was prepared by admixing 32.5 parts of dimethylethanolamine, 22.5 parts of acetic acid and 15.5 parts of isopropanol. The salt solution was added to the above resin solution beginning at a temperature of 49°C. over a period of 20 minutes, with the temperature ranging from 49°C. to 75°C. After the addition was complete, the reaction mixture was held at 75°–85°C. for an additional 5 minutes. There was then added 287 parts of deionized water over a 5-minute period to yield the resin solution at a temperature of 62°C. The analysis of the resin, adjusted to 100 percent solids, was as follows:

| | |
|---|---|
| Epoxy value | 650 |
| Hydroxyl value | 140 |
| Quaternary acetate groups per gram of resin | 0.364 |
| Milliequivalents of amine acetate per gram of resin | 0.085 |

To 215 parts of the above resin solution was added 1200 parts of deionized water. The resultant electrodeposition bath had a pH of 8.5. Films when electrodeposited at 150 volts were rough, hard films.

EXAMPLE II

Into a reactor as described in Example I was charged 500 parts of Epon 834. The resin was heated to 80°C. A salt solution comprising 112.3 parts of 40 percent dimethylamine in water, and 106 parts of 85 percent lactic acid in water, having a pH of 4.3, was added at a temperature of 80°–85°C. over a 20 minute period. The reaction mixture was then heated to 97°C. and refluxed for 20 minutes. There was then added 169 parts of deionized water, followed by 100 parts of ethyl Cellosolve and 10 parts of 90 percent formic acid. The resin dispersion was somewhat cloudy. There was then added to the resin dispersion sufficient water to form a 10 percent solids bath. Sufficient formic acid was added to adjust the pH to 2.5.

An aluminum strip was electrocoated at a bath temperature of 80°F. at 100 volts for 60 seconds. The film was deposited on the cathode, and was baked at 350°F. for 20 minutes. A glossy, hard yellow film was obtained.

The resin at 100 percent solids had the following properties:

| | |
|---|---|
| Epoxy value | 1160 |
| Hydroxyl value | 141 |

The electrodeposition bath analyzed to contain:

| | |
|---|---|
| Milliequivalents of amine per gram of resin | 0.2145 |
| Milliequivalents of quaternary base groups per gram of resin | 0.2830 |
| Milliequivalents of acid per gram of resin | 0.4980 |

EXAMPLE III

Into a reactor as described in Example I was charged 500 parts of Epon 834. This resin was heated to 80°C. and there was added a salt solution formed by admixing 101 parts of dipropylamine and 106 parts 85 percent lactic acid, together with 33 parts of isopropanol. The salt solution was added at 80°–85°C. with heat over a 20-minute period. After the addition was complete, the reaction mixture was heated to 95°C. and refluxed for 20 minutes. 167 parts of deionized water were then added. A cloudy resin dispersion was obtained, to which was added 100 parts ethyl Cellosolve, 10 parts of 90 percent formic acid. A clear yellow resin solution was obtained.

Analysis of the product adjusted to 100 percent solids is as follows:

| | |
|---|---|
| Epoxy value | 1120 |
| Hydroxyl value | 143 |

The resin was analyzed to contain:

| | |
|---|---|
| Milliequivalents of amine per gram of resin | 0.0675 |
| Milliequivalents of quaternary base groups per gram of resin | 0.4310 |
| Milliequivalents of acid per gram of resin | 0.4985 |

Useful electrodeposited films were obtained.

EXAMPLE IV

Into a reactor equipped with stirrer, thermometer, condenser, inert gas blanket and heating element was charged 1005 parts Epon 829 and 339 parts of bisphenol A. The mixture was heated to 180°C. and held for 45 minutes at 180°–188°C. There was then added at 120°C., 114 parts of isopropanol and the mixture cooled to 79°C. There was then added 141.0 parts of a 75 percent solids solution in isopropanol of dimethylethanolamine lactate over a 20-minute period between 79°C. and 93°C. with heating. The reaction mixture was held at 93°C.–97°C. for two additional minutes, and there was then added 425 parts of deionized water over a four-minute period at which time the temperature was 75°C.

There was then added a solution of 7 parts of Foam Kill 639 and 90 parts of 2-ethylhexanol. A clear yellow resin solution was obtained. This is hereinafter referred to as the base resin.

| Analysis (100% solids) | |
|---|---|
| Epoxy value | 1085 |
| Hydroxyl value | 233 |

To 272 parts of the base resin was added 1630 parts of deionized water to yield a 10 percent solids electrodeposition bath with a pH of 6.7. Zinc phosphate steel panels were electrocoated at 250 volts for 90 seconds at 80°F. Uniform film build was noted. The film was baked at 350°F. for 30 minutes to yield a glossy film, 0.45 mils, pencil hardness 6H. Film electrocoated at 300 volts for 90 seconds at 80°F. and baked as above yielded 0.5 mil pencil hardness 6H.

EXAMPLE V

Into a reactor equipped with thermometer, stirrer, reflux condenser, and means for providing an inert gas blanket were charged 1770 parts of Epon 829 and 302 parts of Bisphenol A. The mixture was heated to 170°C., at which time an exotherm occurred. The reaction mixture was held at 180°C. to 185°C. for 45 minutes. The reaction mixture was then cooled to 130°C. to 135°C. with the addition of 850 parts of polypropylene glycol with a molecular weight of approximately 625. There was then added 5.5 parts of dimethylethanolamine. The reaction mixture was held at 130°C. to 140°C. from 4 to 5 hours. The reaction mixture had a Gardner-Holdt viscosity of L-measured in 50 percent solids, the additional solvent comprising 90 percent isophorone and 10 percent toluene.

The reaction mixture was cooled to 129°C. and a small amount of formic acid added to neutralize the amine catalyst. The reaction mixture was cooled to 108°C. and there was added 225 parts of 2-ethylhexanol and having dissolved therein 15.2 parts of Foam Kill 639. The reaction mixture was cooled to 97°C. and there was added 225 parts of isopropanol.

At 80°C. there was added 120 parts of the reaction product of Example A and the reaction mixture heated for 20 minutes at 80°C. to 89°C.

The resultant product was divided into three parts. The first part was heated to 100°C. for approximately 15 minutes, at which time gelation occurred. The second part was heated at 105°C. for 11 minutes, at which time gelation occurred. To the third part, a small amount of water was added and the mixture heated at 93°C. for 20 minutes to yield a viscous, dark red resin. At the end of the reaction, this product had the following values, adjusted to 100 percent solids:

| | |
|---|---|
| Hydroxyl value | 288 |
| Epoxy equivalent | 1034 |

EXAMPLE VI

Into a reactor equipped as in Example V there was charged 1770 parts of Epon 829 and 302 parts of Bisphenol A. The reaction mixture was heated to 180°C., at which time an exotherm was noted. The reaction mixture was held at 180°C. to 189°C. for 45 minutes, at which time 850 parts of a polypropylene glycol having molecular weight of approximately 625 was added with cooling to 100°C. 5.5 parts of dimethyl ethanolamine were added and the reaction mixture heated to 130°C. to 138°C. for four hours, at which time the resultant product had a Gardner-Holdt viscosity of M+, measured at 50 percent solids. The additional solvent was a 90/10 mixture of isophorone and toluene. The reaction mixture was cooled to 134°C. and there was added 3.7 parts of 90 percent formic acid to neutralize the amine catalyst.

The resultant resin analyzed to have the following values, adjusted to 100 percent solids:

| | |
|---|---|
| Hydroxyl value | 278 |
| Epoxy equivalent | 880 |

This product is hereinafter termed the base resin.

To 400 parts of the base resin at 75°C. was added 50 parts of isopropanol, and a solution of 2.1 parts of Foam Kill 639 and 35 parts of 2-ethylhexanol. The mixture was heated to 93°C., at which time 16.4 parts of the reaction product of Example A were added. The reaction mixture was held at 93°C. for 15 minutes, at which time it had a Gardner-Holdt viscosity measure of C-D at 44 percent solids, the resin solution being diluted with ethyl Cellosolve. The reaction mixture was held at 93°C. for an additional 15 minutes at which a 50 percent solids reaction product had a Gardner-Holdt viscosity of L. After an additional 3 minutes at 93°C., the reaction mixture gelled.

To 400 parts of the base resin at 75°C. was added 50 parts of isopropanol and a solution of 2.1 parts of Foam Kill 639 and 35 parts of 2-ethylhexanol. There was then added a solution of 16.4 parts of the reaction product of Example A and 8.2 parts of water. After 15 minutes at 92°C. to 94°C., the reaction mixture had a Gardner-Holdt viscosity of G-H, at 50 percent solids in ethyl Cellosolve. 24 minutes later at 93°C., the reaction mixture had a viscosity of H+. 50 minutes later at 93°C., the reaction mixture had a viscosity of H+ (an additional 95 parts of water were added). This reaction mixture contained 2.33 percent water, based on total solids and had a water to nitrogen equivalence of 8.0:1.0, before the addition of the 95 parts of water.

EXAMPLE VII

The following reaction product was prepared in the presence of 4 percent water, based on total solids and at a water-to-nitrogen equivalence of 6.5:1.

Into a reactor equipped as in Example V was charged 1770 parts of Epon 829 and 302 parts of Bisphenol A. The mixture was held at 180°C. to 187°C. for 45 minutes at which time there was added 850 parts of polypropylene glycol 625 with cooling to 135°C. There was then added 5.5 parts of dimethylolamine and the reaction mixture held from 130°C. to 140°C. for 4.5 hours, at which time the reaction mixture had a Gardner-Holdt viscosity of L+ measured at 50 percent solids, the reaction product being reduced by a 90/10 mixture of isophorone and toluene.

There was then added at 134°C., 3.7 parts of 90 percent formic acid to neutralize the amine catalyst.

At 115°C., 330 parts of butyl Cellosolve were added. At 90°C., there was added 150 parts of a dimethylethanolamine acetate salt and 120 parts of water (the salt being formed by admixing 150 parts of glacial acetic acid with 205 parts of dimethylethanolamine. The resultant salt had a pH of 5.6–5.7.)

After the addition of salt, the reaction mixture was controlled at 90°C. to 95°C. for 26 minutes. There was then added at 93°C., 37.5 parts of isopropyl alcohol and 730 parts of deionized water. A clear yellow resin solution resulted.

EXAMPLE VIII

Into a reactor equipped with a thermometer, stirrer, reflux condenser and means for providing an inert gas blanket were charged 1770 parts of Epon 829, 302 parts of Bisphenol A at 170°C. and an exotherm was noted. The reaction mixture was held at 180°C. to 185°C. for 45 minutes. The resultant resin had an epoxy equivalent of 330 to 350 at 100 percent solids. This resin is hereinafter referred to as the base resin.

The following resin was prepared in the presence of 1.38 percent water, based on total solids, and a 1.1:1 equivalence ratio of water-to-nitrogen.

To 730 parts of the base resin was added a mixture of 153 parts of the product of Example A and 1.4 parts of water, and the mixture was added at 87°C. After two minutes, there was an exotherm from 87°C. to 95°C. and the resin began to clear. After an additional minute, the exoterm had reached 108°C.; after an additional four minutes, the exotherm had reached 117°C.; and after yet an additional minute the exotherm had reached 122°C. and the reactor was cooled with an external water bath. After additional four minutes the exotherm had reached 136°C. and after an additional two minutes the exotherm had reached 138°C. Water was added to the reactor to stop the reaction to yield a 78.6 percent solids product at a temperature of 75°C. The reaction product had a hydroxyl value of 179 and an infinite epoxy value. It contained 0.609 milliequivalents of quaternary ammonium base groups per gram of solids.

On cooling the reaction product was a reddish-brown, brittle, horny substance which readily dissolved in water. 150 parts of the resin were dissolved in 542 parts of water. The resultant electrodeposition bath had a pH of 6.3. An aluminum strip was coated at 100 volts for 60 seconds at 77°F. and the resultant coating baked at 350°F. for 30 minutes. A heavy orange film was electrodeposited and the baked film was brown and very glossy, had excessive flow and poor acetone resistance. The electrodeposition bath had a rupture voltage of 275 volts at 77°F.

EXAMPLE IX

The resin in this example was prepared in the presence of 1.2 percent water, based on total solids, and at a water-to-nitrogen equivalency of 0.39:0.44.

To 500 parts of the base resin of Example VIII was added 105 parts of the product of Example A at a temperature of 90°C. Heating was terminated. After 5 minutes, the reaction mixture exothermed at 115°C. After an additional two minutes, the exotherm had reached 120°C. and external cooling was commenced. Viscosity increased rapidly. After an additional four minutes the reaction temperature was 128°C. After an additional nine minutes, the reaction temperature had dropped to 125°C. and the resin was cooled to room temperature. A dark amber solid resulted which was readily soluble in water. It analyzed to have an infinite epoxy value and a hydroxy value of 273.

A portion of the product was dissolved in water to yield a 10 percent solids solution with a pH of 6.9. Aluminum panels were coated at 100 volts for 30 seconds at a temperature of 77°F. and baked at 350°F. for 30 minutes. The film had excessive flow and was hard and brittle and had poor acetone resistance.

EXAMPLE X

The resin in this example was prepared in the presence of 5 percent water based on total solids and had a water-to-nitrogen equivalency of 1.74:0.44.

To 500 parts of the base resin of Example VIII were added 105 parts of the product of Example A, together with 24.3 parts of water. The mixture was heated to 92°C. and the heat removed. The temperature dropped to 74°C. externally. Heating was applied after 5 minutes at 74°C. The reaction mixture was cloudy. After an additional 7 minutes, the reaction temperature was 87°C. and external heating was removed. Two minutes later the temperature was 92°C.; one minute later 94°C.; and one minute later 96°C. After an additional minute the temperature had reached 97°C. and the reaction mixture began to clear. After an additional minute, the reaction temperature was 101°C. In the next minute the reaction temperature dropped to 99°C. and the resin was clear. After an additional 6 minutes, the temperature dropped to 94°C. and external heating was applied, raising the temperature to 102°C. for an additional 7 minutes. The resin viscosity was determined at 50 percent solids in ethyl Cellosolve as E-F Gardner-Holdt viscosity. After an additional 30 minutes of heating the Gardner-Holdt viscosity was H-I, measured in the same manner. The resultant reaction product was a clear yellow solution at 92 percent solids. When adjusted to 100 percent solids, the reaction product had an epoxy equivalent of 1050 and an hydroxyl value of 338. The reaction product contained 0.666 milliequivalents of quaternary ammonium lactate per gram of solids.

100 parts of the above reaction product was reduced to 10 percent solids to yield an electrodeposition bath having a pH of 6.8, which was a blue-green dispersion. Aluminum strips were electrocoated at 80 volts for 30 seconds at 77°F., and the film baked at 350°F. for 30 minutes. A soft, glossy film was obtained.

EXAMPLE XI

A reaction in this example was conducted in the presence of 62.5 percent water, based on total solids with a water-to-nitrogen equivalency of 53.4:0.44.

500 parts of the base resin of Example VIII were charged into a reactor as described in Example V. The resin was heated to 110°C. There was then added a solution of 105 parts of the product of Example A and 955 parts of water. The temperature dropped to 82°C. and the reaction mixture was a two-phase mixture. After a total reaction time of 50 minutes with heating from 93°C. to 98°C., essentially no reaction occurred. The stirrer was stopped and the two phases separated. Analysis of the resin layer showed the following values, adjusted to 100 percent solids: epoxy equivalent 368, hydroxyl value 189.

EXAMPLE XII

The following reaction was conducted in the presence of 25 percent water, based on total solids.

To 250 parts of the base resin of Example VIII were added a mixture of 52.5 parts of the product of Example A and 94 parts of water, with the resin heated to 102°C. The temperature dropped to 74°C. A two-phase material was obtained. The mixture was heated at 90°C. to 96°C. for 45 minutes and one-phase resinous material was obtained. After an additional 30 minutes heating at 95°C. to 96°C. the reaction mixture was cooled and a hazy, translucent reaction product was obtained containing large resinous granular particles dispersed in the resin. Analysis of the resin adjusted to 100 percent solids:

| Epoxy equivalent | 870 |
|---|---|
| Hydroxyl value | 197 |

The reaction mixture contained 78.9 percent solids.

EXAMPLE XIII

The following reaction was conducted in the presence of 1.5 percent water, based on total solids, and a water-to-nitrogen equivalency of 0.483:0.44.

To 500 parts of the base resin of Example VIII were added 105 parts of the product of Example A in 1.7 parts of water, the resin having been heated to 98°C. The temperature of the reaction mixture dropped to 82°C. The mixture was hazy and viscous. After two minutes, the reaction had exothermed to 84°C. and the resin began to clear. Heating was removed. After an additional 18 minutes, the reaction temperature had risen to 119°C. External cooling was applied and the reaction mixture was viscous and turning a reddish-brown. After an additional four minutes, the temperature had reached 126°C. There was added 200 parts of water to kill the reaction. A dark reddish-brown, clear, viscous resin was obtained, having the following analytical values, adjusted to 100 percent solids: epoxy equivalent infinite, hydroxyl value 245. The reaction mixture contained 77 percent solids and analyzed to contain 0.684 milliequivalents of quaternary amine per gram of resin solids.

EXAMPLE XIV

This reaction was conducted in the presence of 1.6 percent water, based on total solids and a water-to-nitrogen equivalency of 0.527:0.44.

To 500 parts of the base resin of Example VIII, heated to 95°C., was added a mixture of 105 parts of the product of Example A and 2.5 parts of water. With the addition, the temperature dropped to 82°C., and the reaction product was cloudy. After three minutes, the reaction mixture had exothermed to 85°C. and the reaction mixture began to clear. After an additional 21 minutes, the reaction temperature had reached 110°C. The reaction product was a viscous reddish-brown, clear resin. After an additional four minutes the reaction temperature had risen to 114°C. and an excess of 200 milliliters of water were added to kill the reaction. The reaction mixture was analyzed and contained 72.7 percent solids and the following values, adjusted to 100 percent solids: epoxy equivalent infinite, hydroxyl value 207. The resin analyzed to contain 0.715 milliequivalents of quaternary amine per gram of solids.

EXAMPLE XV

This reaction was conducted in the presence of 1.75 percent water, based on total solids and had a water-to-nitrogen equivalency of 0.573:0.44.

To 500 parts of the base resin of Example VIII, heated to 82°C., was added a solution of 105 parts of the product of Example A and 3.3 parts of water. The temperature dropped to 75°C. and a cloudy material was obtained. After six minutes, the temperature has risen to 83°C. and the reaction mixture began to clear. After an additional six minutes, the temperature had risen to 100°C. and the resin was clear. After an additional minute, the temperature reached 102°C., which was a maximum of the exotherm. After an additional 21 minutes, the temperature dropped to 95°C. There was then added 200 parts of water. A light reddish, viscous resin was obtained. It contained 71 percent solids and had the following values adjusted to 100 percent solids, epoxy equivalency 6250, hydroxyl value 193. The resin contained 0.7704 milliequivalents of quaternary ammonium per gram of resin.

EXAMPLE XVI

This reaction was conducted in the presence of 1.88 percent water, based on total solids, and a water-to-nitrogen equivalency of 0.618:0.44.

To 500 parts of the base resin of Example VIII, heated to 94°C., there was added a solution of 105 parts of the product of Example A in 4 parts of water. The temperature dropped to 78°C. and the reaction mixture was cloudy. After four minutes, the temperature had risen to 83°C., and the reaction mixture began to clear. After an additional minute, the temperature had risen to 84°C., and the reaction mixture was clear. After an additional seven minutes, the temperature had risen to 101°C. and a clear yellow resin was obtained. After an additional 32 minutes, the reaction temperature had dropped to 96°C., at which point 200 parts of water were added and a clear golden resin was obtained containing 73.7 percent solids and having the following analytical values adjusted to 100 percent solids:

| Epoxy equivalent | 4650 |
|---|---|
| Hydroxyl value | 227 |

The resin contained 0.655 milliequivalents of quaternary ammonium per gram of solids.

EXAMPLE XVII

This reaction was conducted in the presence of 2.02 percent water, based on total solids and a water-to-nitrogen equivalency of 0.665:0.44.

To 500 parts of the base resin of Example VIII, heated to 93°C. was added a mixture of 105 parts of the product of Example A and 4.2 parts of water. The temperature dropped to 87°C. and a cloudy reaction mixture was obtained. After seven minutes, the reaction mixture had exothermed 93°C. and was clear. After an additional seven minutes, the temperature peaked at 97°C. and began to drop. After an additional 14 minutes, the temperature dropped to 93°C. and heating was commenced. The material was heated to 15 minutes at 96°C., at which time 220 parts of water were added. A clear yellow resin was obtained containing 73.7 percent solids and having the following analytical values, reduced to 100 percent solids:

| Epoxy equivalent | 1865 |
|---|---|
| Hydroxyl value | 247 |

The resin contained 0.6386 milliequivalent of quaternary ammonium per gram of solids.

EXAMPLE XVIII

An amine of the formula $(CH_3)_2NCH_2CH_2COOH$ was produced from the reaction of dimethylamine (25 percent solution in water) with methyl acrylate, as described in U.S. Pat. No. 3,419,525. This amine (50 parts) was added to a reaction vessel containing 450 parts of Polyepoxide A at 65°C. The temperature rose to 82°C. in 20 minutes; 850 parts of deionized water were slowly added with stirring over a period of 45 minutes. The product was a yellow, clear solution having a solids content of 37.3 percent and an epoxy value of 6361.

The above resin solution after dilution to 10 percent solids with deionized water was electrodeposited using zinc phosphate treated steel electrodes and the following conditions:

| Bath temperature | 80°F. |
|---|---|
| pH | 6.0 |
| Deposition time | 60 seconds |
| Voltage | 400 volts |
| Current | 0.4 amp. max. |

There was obtained an adherent coating on the cathode which was then baked at 400°F. for 10 minutes. The cured coating was hard, flexible, and adherent, having a thickness of about 1.2 mil. It was highly resistant to acetone.

EXAMPLE XIX

Example XVIII was repeated except that the cathode employed was aluminum. Similar results were obtained.

EXAMPLE XX

An amine of the formula $(CH_3)_2NCH_2CH_2OCOCH_2CH_2COOH$ was produced by reacting dimethylethanolamine with succinic anhydride. This amine (4.7 parts) was reacted with 87 parts of Polyepoxide B at 70°C. and diluted with deionized water to a solids content of 59 percent. A 3 mil wet film of this resin solution was drawn on a steel panel and baked at 350°F. for 10 minutes. A hard glossy, cured adherent coating was obtained, having excellent solvent resistance.

The resin solution was further diluted to 10 percent solids with deionized water and formic acid added to a pH of 4–5. Electrodeposition of this product using steel electrodes at 250 volts for 90 seconds provided an adherent coating on the cathode. After baking at 350°F. for 10 minutes, the coating had good solvent resistance.

EXAMPLE XXI

A reaction vessel containing 53.5 parts of Polyepoxide A (80 percent solids in isophorone) was heated to 70°C. There were added 3 parts of an amine produced by reacting dimethylethanolamine with dodecylsuccinic succinic anhydride, and then there were added 6 parts of a second amine produced from dimethylethanolamine and maleic anhydride. During the second addition the temperature was raised to 95°C. and stirring was continued for 15 minutes at this temperature. The product when diluted with water and electrodeposited, as in the above examples, provided an adherent solvent-resistant coating.

EXAMPLE XXII

An amine of the formula $(CH_3)_2NCH_2CH_2OCOCH=CHCOOH$ was made by reacting dimethylethanolamine with maleic anhydride. This amine (53 parts) was reacted at 70°C. with 530 parts of an oxyalkylene-modified polyepoxide produced from 400 parts of Epon 834 with 165 parts of polyethylene glycol (molecular weight 400). After the reaction had progressed for 20 minutes the temperature was 94°C.; there were added 23 parts of isophorone and 425 parts of deionized water, followed by sufficient aqueous formic acid to make the pH 3.7. Additional water was added to make the solids content 10 percent and the composition was electrodeposited, using an aluminum cathode. An adherent coating was obtained on the cathode which after baking at 400°F. for 30 minutes was hard, glossy, and solvent-resistant.

EXAMPLE XXIII

An amine of the formula

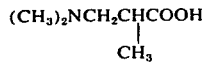

was produced from the reaction of dimethylamine with methyl methacrylate in aqueous solution. Following the procedure of the above examples, 27.8 parts of this amine were reacted with 250 parts of polyepoxide (diglycidyl ether of Bisphenol A, epoxide equivalent 185–200; "Epi-Rez 510") in the presence of 77 parts of the dimethyl ether of diethylene glycol. Water and formic acid were used to reduce the solids content to 5 percent and the pH to 5.9. Electrodeposition of the product on strips of zinc phosphate-treated steel at 200 volts for 20 seconds provided adherent films which after baking at 385°F. for 30 minutes were hard, glossy, extremely solvent-resistant coatings.

Other reaction products can be formed using varied reactants and reaction conditions as set forth in the specification, which have utility as coating compositions.

According to the provisions of the Patent Statutes, there are described above the invention and what are now considered to be its best embodiments. However, within the scope of the appended claims, it is to be understood that the invention can be practiced otherwise than as specifically described.

We claim:

1. A boron-free, water-dispersible, quaternary ammonium salt-containing resin suitable for use in electrodeposition comprising the reaction product of:
   A. a polyglycidyl ether of a polyphenol, and
   B. an amine acid salt,
the weight ratio of said amine acid salt to said polyglycidyl ether being from about one part to about 50 parts by weight of salt per 100 parts by weight of said polyglycidyl ether, said amine salt reacted with said polyglycidyl ether of a polyphenol in an amount and at a temperature below about 110°C. and sufficient to provide a quaternary ammonium salt-containing, water-dispersible resin.

2. The resin of claim 1, wherein said reaction product contains epoxy groups.

3. The resin of claim 1, wherein said reaction product is essentially epoxy group free.

4. The resin of claim 1, wherein said reaction product contains in the resin molecule at least about 0.05 percent by weight of chemically bound nitrogen in the form of a quaternary ammonium base salt.

5. The resin of claim 4, wherein said quaternary ammonium base salt is the salt of an acid having a dissociation constant greater than about $1 \times 10^{-5}$.

6. The resin of claim 4, wherein the acid salt is in the form of an internal Zwitterion.

7. The resin of claim 1 wherein said polyglycidyl ether of a polyphenol corresponds to the average formula:

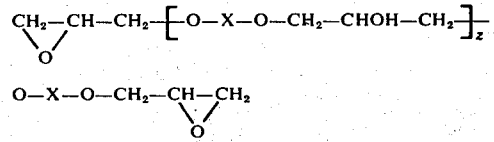

wherein X represents an aromatic radical, and wherein z represents a whole or fractional number.

8. The resin of claim 7, wherein X represents the group:

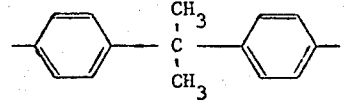

9. An aqueous dispersion comprising a boron-free, water-dispersible, quaternary ammonium salt-containing resin suitable for use in electrodeposition comprising the reaction product of:
   A. a polyglycidyl ether of a polyphenol, and
   B. an amine acid salt,
the weight ratio of said amine acid salt to said polyglycidyl ether being from about one part to about 50 parts by weight of salt per 100 parts by weight of said polyglycidyl ether, said amine salt reacted with said polyglycidyl ether of a polyphenol in an amount and at a temperature below about 110°C. and sufficient to provide a quaternary ammonium salt-containing, water-dispersible resin.

10. The aqueous dispersion of claim 9, wherein said reaction product contains epoxy groups.

11. The aqueous dispersion of claim 9, wherein said reaction product is essentially epoxy group free.

12. The aqueous dispersion of claim 9, wherein said reaction product contains in the resin molecule at least about 0.05 percent by weight of chemically-bound nitrogen in the form of a quaternary ammonium base salt.

13. The aqueous dispersion of claim 12 wherein said quaternary ammonium base salt is the salt of an acid having a dissociation constant greater than about $1 \times 10^{-5}$.

14. The aqueous dispersion of claim 12 wherein the acid salt is in the form of an internal Zwitterion.

15. The aqueous dispersion of claim 8 wherein said polyglycidyl ether of a polyphenol corresponds to the average formula:

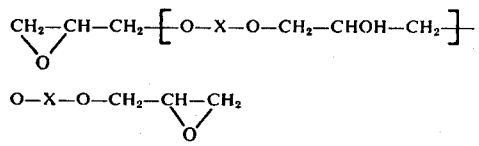

wherein X represents an aromatic radical, and wherein z represents a whole or fractional number.

16. The aqueous dispersion of claim 15, wherein X represents the group:

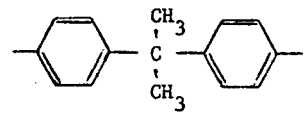

* * * * *

UNITED STATES PATENT OFFICE
CERTIFICATE OF CORRECTION

PATENT NO. : 3,962,165
DATED : June 8, 1976
INVENTOR(S) : Joseph F. Bosso and Marco Wismer It is certified that error appears in the above-identified patent and that said Letters Patent are hereby corrected as shown below:

Cover page, line 1 of ABSTRACT, "salt-containing" should be --resins--.

Cover page, line 5 of ABSTRACT, "contaning" should be --containing--.

Column 4, line 34, "clohexyliocyanate" should be --clohexylisocyanate--.

Column 4, line 68, insert --radicals-- before "containing".

Column 14, line 43, "384" should be --834--.

Column 18, line 16, insert --reaction-- before "mixture".

Signed and Sealed this

Seventeenth Day of August 1976

[SEAL]

Attest:

RUTH C. MASON
Attesting Officer

C. MARSHALL DANN
Commissioner of Patents and Trademarks